United States Patent [19]

Mathias

[11] 4,256,217

[45] Mar. 17, 1981

[54] POSITIONALLY ADJUSTABLE STORING AND CONVEYING APPARATUS FOR MORTAR AND SIMILAR SUBSTANCES

[75] Inventor: Paul Mathias, Merdingen, Fed. Rep. of Germany

[73] Assignee: Mathis Systemtechnik GmbH, Merdingen, Fed. Rep. of Germany

[21] Appl. No.: 53,754

[22] Filed: Jul. 2, 1979

[30] Foreign Application Priority Data

Jan. 30, 1979 [DE] Fed. Rep. of Germany ....... 2903373

[51] Int. Cl.[3] ....................... B65G 47/18; B65G 65/46

[52] U.S. Cl. .................................... 198/536; 198/548; 198/671

[58] Field of Search ........................ 414/326, 503-505, 414/523, 526; 198/536, 548, 558, 616, 671; 417/900

[56] References Cited

U.S. PATENT DOCUMENTS

| | | | |
|---|---|---|---|
| 2,585,169 | 2/1952 | Potter | 414/505 |
| 2,619,219 | 11/1952 | Carroll et al. | 198/548 |
| 2,783,907 | 3/1957 | Hudgins | 414/505 |
| 3,085,674 | 4/1963 | Gooding | 198/671 |
| 3,090,507 | 5/1963 | Gutekunst et al. | 414/326 |
| 3,283,925 | 11/1966 | Gutekunst | 198/548 |
| 4,051,948 | 10/1977 | Sackett, Sr. | 198/616 |

*Primary Examiner*—Johnny D. Cherry

*Attorney, Agent, or Firm*—Peter K. Kontler

[57] ABSTRACT

A storing and conveying apparatus for mortar and similar substances includes a silo-shaped container supported on legs and having a bottom discharge opening, and a screw conveyor mounted underneath the discharge opening of the container, having an inlet opening in a substantial registry with the discharge opening of the container, and being pivotable about substantially horizontal axis between first and second position. In the first position, the discharge and inlet openings are alignedly juxtaposed with one another, and in the second position, the discharge and inlet openings are spaced from each other and inclined at a given angle with respect to one another. An intermediate member of tubular configuration is interposed between and clamped by the conveyor and the container, the intermediate member having respective open ends which respectively communicate with the discharge opening and the inlet opening and extend along planes which enclose the given angle with one another. Cooperating male and female connecting arrangements are also provided for holding the conveyor in the first or the second position. Advantageously, the ends of the intermediate member are sealingly received in depressions of flanges which are connected to the conveyor and to the container, respectively and surround either the discharge opening or the inlet opening.

23 Claims, 7 Drawing Figures

POSITIONALLY ADJUSTABLE STORING AND CONVEYING APPARATUS FOR MORTAR AND SIMILAR SUBSTANCES

BACKGROUND OF THE INVENTION

The present invention relates to a storing and conveying apparatus for particulate substances in general, and more particularly to an arrangement for use in the production of mortar or the like.

It is already known to provide an apparatus of the type here under consideration, which basically includes a container capable of accommodating the ingredients of mortar, and metering and/or mixing arrangement for the ingredients of mortar or similar substances. It is also known to make the container of a silo-shaped configuration and to support the same on legs, and to construct the mixing arrangement as a conveyor provided with an enclosing casing having an inlet opening for admitting the above-mentioned ingredients to a conveyor screw accommodated within the casing. Under these circumstances, it is usual to connect the conveyor to the container in such a manner, and by means of a conventional connecting arrangement, that the inlet opening of the casing of the conveyor communicates with the discharge opening of the container.

In the above-discussed apparatus, the particulate substance containing the ingredients of mortar or the like flows or descends into the conveyor which constitutes the mixing arrangement. Usually, the conveyor includes an advancing screw and, in many instances, also a metering screw or the like, these conveying elements serving for advancing the dry particulate material in the actual producing apparatus in which water is added to these ingredients. In addition thereto, it is also possible to add water directly in the mixing arrangement.

As a result of the dimensions of the container and of its support legs, as well as based on the different ground formations which are encountered at different building sites at which the arrangement is to be erected, the outlet opening of the mixing arrangement can, in many cases, lie lower than the receptacle into which the dry or wet substance is to be introduced or poured from the outlet opening of the conveyor. As mentioned before, this receptacle may be of the type in which the mortar or similar substance is to be transported to the actual point of use only after it has already been mixed with water and thoroughly worked, or it can be a receptacle forming part of a device in which water is added to the particulate material to be mixed with and worked until mortar of substantially uniform consistency is obtained. No improvised measures are possible especially in the latter instance, since the elevation of the upper edge of the receptacle is given. However, under other circumstances, substantially horizontal arrangement of the mixing device is advantageous or desirable, particularly inasmuch as the gravitational forces do not have any considerable effect on the mortar or particulate material present in the mixing device and/or amount of water which is potentially added to the material directly in the mixing device.

Now, it would be possible to lengthen or extend the support legs of the silo-shaped container for achieving higher elevation of the outlet opening of the mixing device. However, this would have the perceivable disadvantage that the stability of the silo-shaped container would be diminished and problems could be encountered during its transportation.

OBJECTS AND SUMMARY OF THE INVENTION

Accordingly, it is a general object of the present invention to avoid the disadvantages of the prior art.

More particularly, it is an object of the invention to provide an apparatus of the above-discussed type which is not possessed of the disadvantages of the prior-art apparatus of this type.

Still another object of the instant invention is to so construct the apparatus that, despite the mounting of the mixing device at a relatively low level, it is possible to use the same for supplying materials to a receptacle which has the marginal portion bounding its inlet located at rather high elevation.

A further object of the invention is to so design the apparatus as to be able to satisfy the previous object without having to lengthen the support legs, to mount the silo-shaped container at a higher elevation, or to accommodate the receiving receptacle in a depression of the ground or the like.

A concomitant object of the invention is to provide an apparatus of the above type which is simple in construction, inexpensive to manufacture, easy to operate, and reliable nevertheless.

In pursuance of these objects and others which will become apparent hereafter, one feature of the present invention resides in a storing and conveying apparatus, especially for use in the production of mortar and similar substances, which, briefly stated, comprises a substantially upright container including a bottom having at least one discharge opening, and a conveyor including a casing having at least one inlet opening and one outlet opening, and at least one conveying element accommodated in the casing and extending from the inlet opening to the outlet opening. The apparatus further includes means for mounting the conveyor on the container for pivoting at least with respect to a horizontal plane between a first position in which the inlet opening is alignedly juxtaposed with the discharge opening and a second position in which the inlet opening is spaced from and inclined at a given angle relative to the discharge opening, and a tubular intermediate member having two ends located along planes enclosing the given angle with each other, and interposable between the container and the conveyor in the second position of the latter in aligned juxtaposition of the open ends with the discharge opening and with the inlet opening, respectively. Advantageously, the container is substantially silo-shaped, and the apparatus further includes a plurality of support legs which support the container above ground. It is also advantageous when the casing is elongated and has the outlet opening at one of its ends, and when the conveying element is a conveyor screw.

When the above-enumerated expedients are used, it is possible to angularly displace the entire conveyor (or mixing device) so that the outlet opening of the conveyor reaches a higher level. As a result of this it is possible to accommodate the apparatus to various conditions, in that the mixing device or conveyor can be utilized either in its substantially horizontal position, or even in its inclined position, depending on the fact whether a relatively high receiving receptacle is to be supplied with the material conveyed by the conveyor, or whether a receiving receptacle of a lesser height can be used. In any event, it is especially advantageous when the pivoting axle which mounts the conveyor on the container extends substantially horizontally.

A particularly advantageous embodiment of the present invention can be obtained when the bottom of the container includes a tubular bottom portion having a radial flange at an end thereof which is remote from the remainder of the container and surrounding the discharge opening, and when the mounting means includes an auxiliary flange having a through opening, mounted on the container for the above-mentioned pivoting, and substantially alignedly juxtaposed with the flange of the bottom portion in the first position of the conveyor. Then, the conveyor or mixing device can be affixed to the auxiliary flange so that it can be angularly displaced or pivoted without encountering any difficulties. When the auxiliary flange is displaced into a position corresponding to the second position of the conveyor, the above-mentioned tubular intermediate member can be introduced between the flanges, and the apparatus in its totality can operate in the same manner as heretofore, with the sole exception that a certain amount of upward movement of the mortar or similar substance is necessary under these circumstances. This will be especially the case when dry mortar or a similar particulate substance is to be conveyed or advanced into an arrangement for mixing and working the mortar. However, this application is also possible, under certain circumstances, when the mixing device itself already serves for making the ready-to-use mortar or a similar substance, but a relatively huge and high receiving receptacle is to be filled.

In addition to the possibility to provide the intermediate member with flanges and connect such flanges to those flanges which are connected by the pivot axle, it can be especially advantageous when at least one (but preferably both) of the above-mentioned flanges is provided with a depression around its opening, the depression having transverse dimensions at least equal to the corresponding dimensions of the respective associated ends of the intermediate member for substantially sealingly receiving the latter in the second position. Under these circumstances, the intermediate member can have a very simple construction inasmuch as it can be clamped between the above-mentioned flanges then assuming the second position.

In accordance to another aspect of the present invention, there may be provided various means for connecting the components which together constitute the apparatus in such a manner that the conveyor is securely held in the selected position thereof. It is also advantageous to provide a least one additional intermediate member which is interposable between the container and the conveyor instead of the above-discussed intermediate member and which is similar to the latter except that the angle which the planes of the two open ends of the intermediate member enclose with one another are different so that the angle at which the conveyor extends with respect to the horizontal in its tilted position is also different commensurately to the above-mentioned angle of the planes of the open ends.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
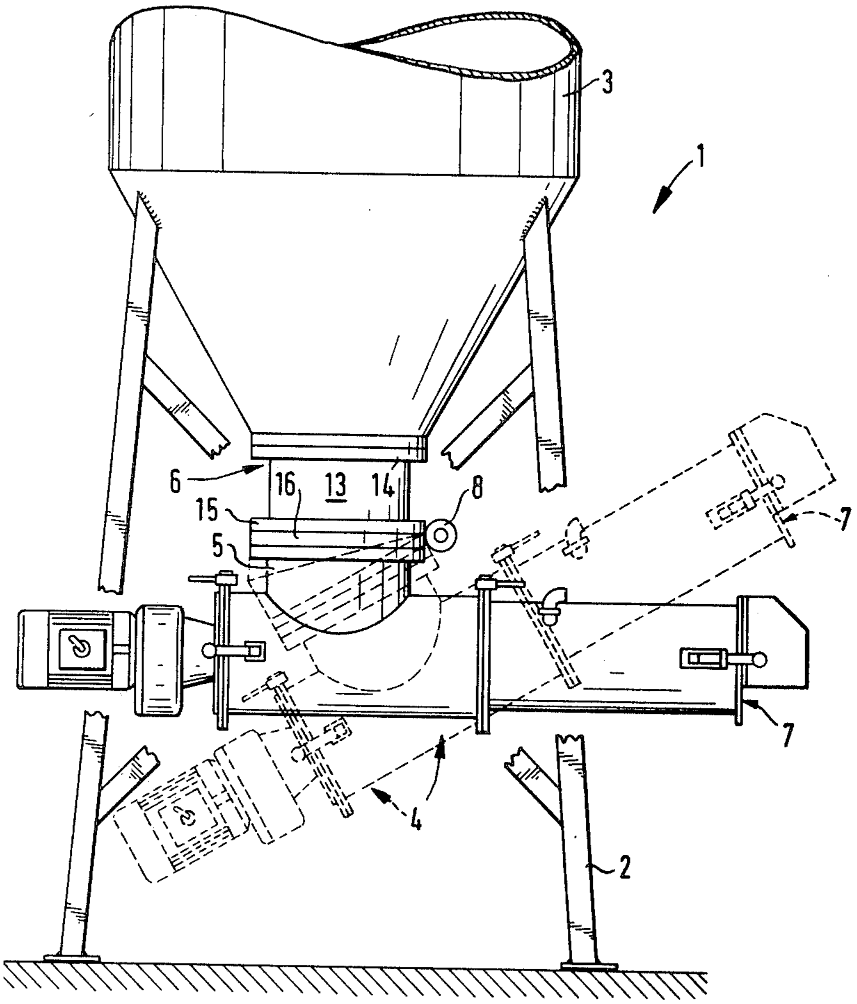
FIG. 1 is a partially fragmented side elevational view of the apparatus of the present invention with a mixing device shown in bold lines in its horizontal position and in broken lines in its tilted position.

Referring now to the drawing in detail, and first to FIG. 1 thereof, it may be seen that the reference numeral 1 has been used for identifying an apparatus according to the invention, for use in the production of mortar, plaster, concrete or the like, in its totality. The arrangement 1 includes a silo-shaped container 3 which is supported above the ground on legs 2. The apparatus 1 further includes a conveyor 4 which can also serve as a metering and/or mixing arrangement, and which has an inlet 5 which opens onto a conveyor screw or a similar conveying element which is conventional in nature and thus has not been illustrated in any detail. However, reference may be had to my copending application Ser. No. 884,409, filed on Mar. 8, 1978 for details of a metering and mixing device which may be used to advantage as the conveyor or mixing device 4 in the environment of the apparatus 1 of the present invention. The inlet opening 5 is so arranged that it can be alignedly juxtaposed with a discharge portion 6 of the container 3 and that it can be held in this position by a holding arrangement of any conventional construction, but most preferably by a holding arrangement which is yet to be discussed.

The mixing device or conveyor 4 is elongated and has an outlet opening 7 at one of its ends. In order to obtain a direct feeding of the dry or wet material received in the conveyor 4 into a receptacle, for instance, of a fine plastering machine, where an upper marginal portion of the receptacle bounding the opening through which the material is to be fed into the receptacle is at a relatively high level, the arrangement which connects the conveyor 4 to the container 3 is equipped with a joint or pivot 8. The joint 8 mounts the conveyor 4 on the container 3 for an angular displacement at least with respect to one, especially a horizontal, plane. As seen particularly in FIGS. 4 and 5, the apparatus 1 also includes a substantially tubular intermediate member 9 which has respective end edges 10 and 11, the planes along which the end edges 10 and 11 extend enclosing an angle with one another which corresponds to the angle of tilting of the conveyor 4. While this arrangement is particularly clearly shown in FIGS. 4 and 5, it is also illustrated in broken lines in FIG. 1. As illustrated, a pivoting axis 12 of the joint 8 is arranged horizontally which, in turn, means that the conveyor or mixing device 4 performs its angular displacement in a vertical plane. It can clearly be ascertained from FIG. 1 that the outlet opening 7 of the conveyor 4 can be raised to a higher level in this manner, so that the material contained within the conveyor 4 and advanced thereby toward and through the outlet opening 7 can be fed also into higher receptacles.

In the illustrated embodiment of the present invention the container 3 is provided with a connecting element or member 13 which is constructed as a pipe section and which is provided with a flange 14. The connecting element 13 thus constitutes the outlet portion 6 of the silo-shaped container 3. The connecting element 13 is provided, at its end which is remote from the remainder of the container 3, with a further flange 15 or a similar coupling portion which is preferably rigidly connected to the connecting element 13. Furthermore, there is provided an additional flange 16 or the like which substantially corresponds to the flange 15 and is tiltably mounted on the latter by the joint 8. Now, when the mixing arrangement or conveyor 4 is attached to the additional flange 16 in a manner which will be discussed later, it can be angularly displaced in the desired manner about the pivoting axis 12. After the pivotal displacement of the conveyor 4 out of the substantially horizontal position thereof illustrated in FIG. 1, the intermediate member 9 can be, and usually is, introduced between the flanges 15 and 16.

The flanges 15 and 16 which are connected to one another by means of the joint 8 are provided, at the surfaces thereof which face each other, with respective depressions 17*a* and 17*b* which substantially correspond to one another as to their configuration. This can be best seen from FIGS. 4 and 5, from which it also appears that the depressions 17*a* and 17*b* respectively surround a discharge opening 15*a* bounded by the flange 15, and a through opening 16*a* of the flange 16 that communicates with an inlet opening of the conveyor 4. Preferably, the depressions 17*a* and 17*b* are so configurated as to be able to serve as sealing surfaces. The inner diameter of the depressions 17*a* and 17*b* is the same as or larger than the outer diameter of the end portions of the connecting member 9 which bound the openings at the edges 10 and 11. As a result of this construction, the intermediate member 9 can be introduced into the space between the flanges 15 and 16 which are angularly spaced apart and then be sealingly received in the depressions 17*a* and 17*b* of the respective flanges 15 and 16 and retained therein. In the final assembled position of the flanges 15 and 16 and of the intermediate member 9, the latter cannot slide out of the gap between the flanges 15 and 16, especially when a clamping force is applied to the flange 16 urging the same toward the flange 15. Such a clamping force is often necessary in order to maintain the flange 16 in its angularly displaced position.

Figure 4:
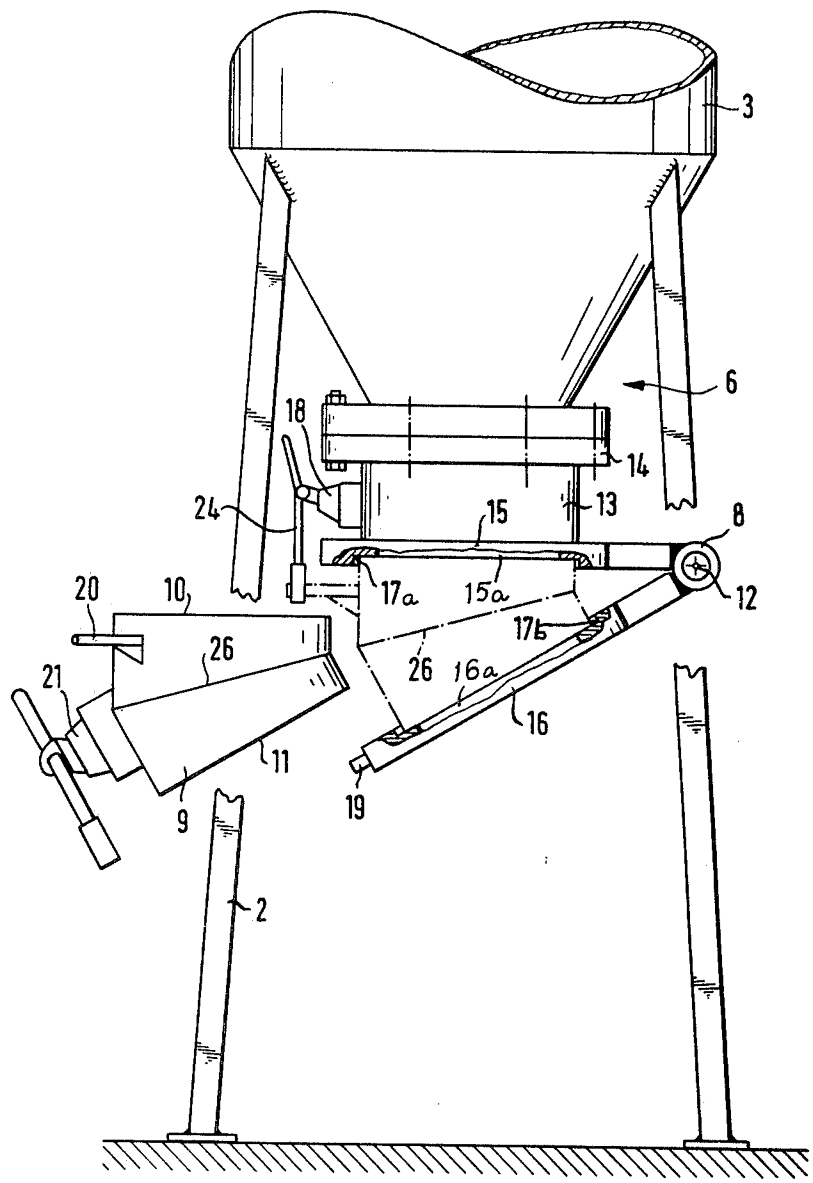
FIG. 4 is a side elevational view corresponding to FIG. 1, but in a position in which the mounting arrangement is angularly displaced into the position corresponding to the tilted position of the mixing device, and showing an intermediate member in bold lines prior to its assembly with the remainder of the apparatus, and in broken lines after such assembly.

As seen with particular clarity in FIG. 4, connecting means 24 fixing or maintaining the position of the angularly displaceable flange 16 are provided either on the container 3 directly, or on the connecting element 13 which is rigid therewith and also on the angularly displacable flange 16. Preferably, additional connecting means are also provided on the intermediate member 9. These connecting means, which will be presently described in more detail, maintain the angularly displaceable flange 16 in its downwardly displaced position in which the intermediate member 9 is inserted between, and particularly clamped by, the flanges 15 and 16. Connecting means 18 on the connecting element 13, connecting means 19 on the angularly displaceable flange 16, as well as the connecting means 20 on the intermediate member 9, can be clearly discerned in this Figure.

Figure 2:
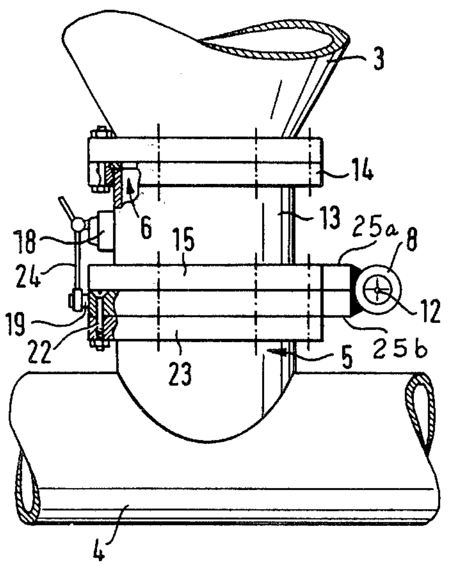
FIG. 2 is a side elevational view, on an enlarged scale, of a detail of the apparatus of FIG. 1 showing a mounting arrangement in a position corresponding to the horizontal position of the mixing device.

It may be seen that, in the situation illustrated in FIG. 2, for instance, the connecting means 18 and 19 engage each other and the angularly displaceable flange 16 assumes a position in which it is in direct contact and juxtaposed alignment with the flange 15. On the other hand, in the position of FIGS. 4 and 5, the flange 16 is in its angularly displaced position away from the flange 15, and the connecting means 18 and 20 on the one hand, and further connecting means 21 on the intermediate member 9 and the connecting means 19 of the angularly displaceable flange 16 are in engagement with one another.

Figure 5:
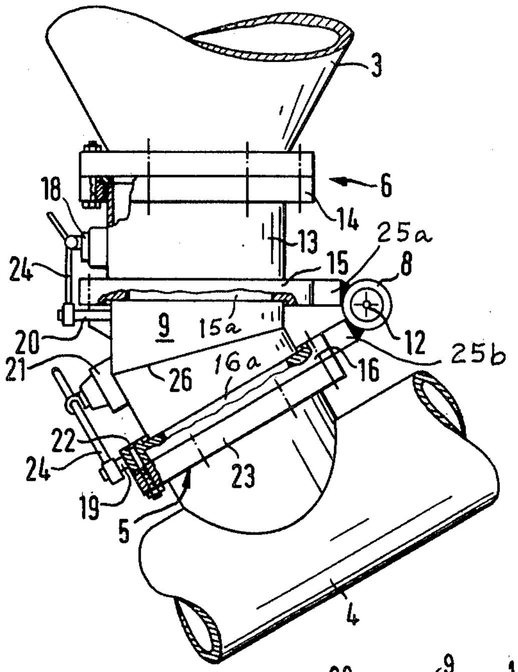
FIG. 5 is a view corresponding to FIG. 2 in a position of the mounting arrangement corresponding to the tilted position of the mixing device.

The angularly displaceable flange 16 is further provided with additional connecting means, such as threaded bores 22 and associated screws, serving the purpose of connecting a further flange 23 provided at the inlet portion 5 of the conveyor 4 to the flange 16 (compare FIG. 5). The connecting means 20 on the intermediate member 9 serve for connection with the connecting element 13, which is most clearly shown in FIGS. 4 and 5.

Figure 3:
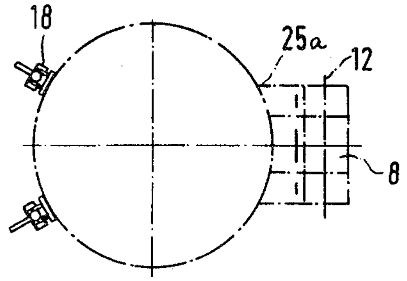
FIG. 3 is a top plan view illustrating the connecting elements in bold lines and the parts of the apparatus connected thereby in phantom lines.
Figure 6:
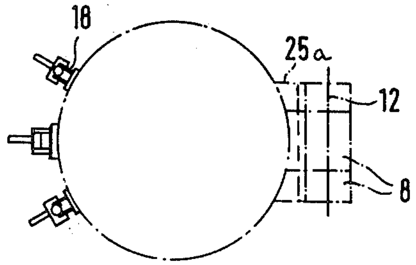
FIG. 6 is a view similar to FIG. 3 but showing the disposition of the connecting elements in the situtation of FIG. 5.

It may be seen in FIGS. 3 and 6 that the connecting means, which usually include male and female connecting elements and which serve for connecting the connecting member 13 and the intermediate member 9, are arranged substantially at the side of the flanges 15 and 16 which is opposite to the joint 8. This is rendered possible by the fact that the joint 8 by itself also constitutes a connecting element for connecting the flanges 15 and 16 to one another.

Tensioning hooks 24 or similar, preferably rigid, tensioning means are provided as the connecting means in the embodiment illustrated in the drawing. These hooks 24 can engage corresponding projections, pins and/or in recesses or holes of the respectively other components of the apparatus 1 which serve as the connecting means 18, 19, 20 and 21. As a result of this construction, there is obtained an especially guick mounting of the intermediate member 9, while simultaneously the connection between the container 3 and the conveyor 4 is such that the material flowing from the container 3 into the conveyor 4 is prevented from escaping into the environment.

The intermediate member 9, as shown in FIG. 5, is connected by means of such connecting elements 24 with the angularly displaceable flange 16, and the connecting element 13 is detachably coupleable by means of further connecting elements 24 with the intermediate member 9.

As may be seen in FIGS. 3 and 6, the flanges 15 and 16 which are angularly displaceable relative to one another are round and have corresponding lugs 25*a* and 25*b* (see FIG. 4) for the parts of the joint 8 which are connectable by means of the pivot axis 12.

Figure 7:
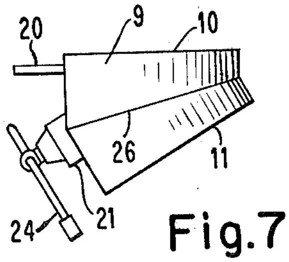
FIG. 7 is a side elevational view of an additional intermediate member which can be used in the mounting arrangement instead of that illustrated in FIG. 4.

It is to be mentioned that a plurality or set of intermediate members 9 can be provided for different angles of displacement of the conveyor 4. The reason for this is that, advantageously, only the smallest extent of the angular displacement of the conveyor 4 will be selected, in order to minimize the influence of gravity on the conveyor 4 and the particulate material contained and advanced therein. One such additional intermediate member 9 of a small angle between the planes of the edges 10 and 11 is shown in FIG. 7.

A pipe elbow or the like may be used for the intermediate member 9. In the illustrated embodiments, two straight pipe sections are joined to one another at a miter joint 26. As may be seen, for instance, in FIG. 4, the miter joint or seam 26 extends substantially along a plane which halves the angle enclosed by the planes of the edges 10 and 11 of the intermediate member 9. As a result of this expedient, there is obtained an intermediate member 9 which is very easy to manufacture, particularly inasmuch as the two sections which constitute the intermediate member 9 can be, for all intents and purposes, of identical configurations.

According to a currently preferred additional feature of the present invention, the joint 8 is arranged at that side of the flanges 15 and 16 which is closest to the outlet opening 7 of the detachable conveyor 4. It is particularly advantageous when the joint 8 is situated approximately above the region of the center of gravity of the conveyor or mixing arrangement 4. Under these circumstances, only a minute force is required for angularly displacing the conveyor 4 so that it is unnecessary to resort to the use of any complex auxiliary means for displacing the conveyor 4 between its positions. As a matter of fact, the displacement can be accomplished manually; however, if desired, an auxiliary equipment, such as a hydraulically or pneumatically operated cylinder-and-piston unit, can be interposed between the legs 2 or the container 3, on the one hand, and the conveyor 4, on the other hand, to displace the latter between its positions when energized. Another advantage of the location of the joint 8 upwardly of the center of gravity is that the various connecting means are loaded only to the minimum obtainable extent.

Taken together, there is obtained an apparatus of the type here under consideration in which it is possible to so adjust, in a very simple manner, the position of the conveyor for advancing or conveying the mortar, plaster or similar substance from a container into a receptacle, for example, of a fine plastering machine or the like, so as to take into account the various possible dimensions of the receptacle or of the machine with which it is associated. Another advantage of the apparatus of the present invention is that it is no longer necessary to adjust the position of the container, which is very heavy especially when fully or partially filled with the particulate substance, or to use legs supporting the container which are, for instance, telescopically or otherwise adjustable as to their length. Simultaneously therewith, the construction used in accordance with the present invention, which renders it possible to achieve an adjustment of the outlet opening of the conveyor to different heights of the receptacles, is very simple and very easy to manipulate.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the claims.

I claim:

1. A storing and conveying apparatus, especially for use in the production of mortar and similar substances, comprising a substantially upright container including a bottom having at least one discharge opening; a conveyor including a casing having at least one inlet opening and one outlet opening, and at least one conveying element accommodated in said casing and extending from said inlet opening to said outlet opening; means for mounting said conveyor on said container for pivoting at least with respect to a horizontal plane between a first position in which said inlet opening is alignedly juxtaposed with said discharge opening and a second position in which said inlet opening is spaced from and inclined at a given angle relative to said discharge opening; and a tubular intermediate member having two open ends located along planes enclosing said given angle with each other, and interposable between said container and said conveyor in said second position of the latter in aligned juxtaposition of said open ends with said discharge opening and with said inlet opening, respectively.

2. An apparatus as defined in claim 1, wherein said container is substantially silo-shaped; and further comprising a plurality of support legs supporting said container above the ground.

3. An apparatus as defined in claim 1, wherein said casing is elongated and has said outlet opening at one of its ends; and wherein said conveying element is a conveyor screw.

4. An apparatus as defined in claim 1, wherein said mounting means includes a pivoting axle centered on a substantially horizontal axis.

5. An apparatus as defined in claim 1, wherein said bottom of said container includes a tubular bottom portion having a radial flange at an end thereof which is remote from the remainder of the container and surrounding said discharge opening; and wherein said mounting means includes an auxiliary flange having a through opening, mounted on said container for said pivoting, and substantially alignedly juxtaposed with said flange of said bottom portion in said first position of said conveyor.

6. An apparatus as defined in claim 5, wherein at least one of said flanges has a depression around its opening having transverse dimensions at least equal to the corresponding dimensions of a respective one of said two ends of said intermediate member for substantially sealingly receiving the latter in said second position of said conveyor.

7. An apparatus as defined in claim 6, wherein the other of said flanges also has a depression similar to said depression, registering therewith in said first position, and receiving the other end of said intermediate member in said second position of said conveyor.

8. An apparatus as defined in claim 1, wherein said container further includes a main portion, and means for connecting said bottom of said container to said main portion.

9. An apparatus as defined in claim 1; and further comprising means for holding said conveyor in said positions thereof.

10. An apparatus as defined in claim 9, wherein said holding means includes first and second associated connecting means respectively attached to said container and to said conveyor and engaging each other at least in said first position of said conveyor.

11. An apparatus as defined in claim 10, wherein said holding means further includes third and fourth connecting means attached to said intermediate member and respectively associated with said first and second connecting means for engagement therewith in said second position of said conveyor.

12. An apparatus as defined in claim 11, wherein said associated connecting means are so constructed as to clamp said intermediate member between said container and said conveyor when engaged.

13. An apparatus as defined in claim 11, wherein at least one of said associated connecting means includes an aperture, and wherein the other of said associated connecting means includes a rigid connecting member having a connecting portion received in said aperture when engaged.

14. An apparatus as defined in claim 11, wherein at least one of said associated connecting means includes a projection, and wherein the other of said associated connecting means includes a rigid connecting member having a connecting portion engageable with said projection.

15. An apparatus as defined in claim 9, wherein said holding means is arranged at a side of said discharge and inlet openings which is substantially opposite to that of said mounting means.

16. An apparatus as defined in claim 1, wherein said mounting means includes an auxiliary flange mounted on said container for said pivoting, and means for securing said conveyor to said auxiliary flange.

17. An apparatus as defined in claim 16, wherein said mounting means includes at least one pivot; wherein said bottom of said container includes a flange surrounding said discharge opening; and wherein said flange and said auxiliary flange are substantially circular and coextensive in said first position of said conveyor and have respective lugs supported on said pivot.

18. An apparatus as defined in claim 1; and further comprising at least one additional tubular intermediate member similar to said intermediate member and having a different angle between said planes for aligned juxtaposition between said container and said conveyor in a different angular position of the latter.

19. An apparatus as defined in claim 1, wherein said intermediate member has a configuration of a pipe elbow.

20. An apparatus as defined in claim 19, wherein said intermediate member includes two tubular sections joined at a miter joint.

21. An apparatus as defined in claim 20, wherein said miter joint extends substantially along a plane halving said angle between said planes.

22. An apparatus as defined in claim 1, wherein said mounting means is arranged at that side of said discharge and inlet openings which is closer to said outlet opening of said conveyor.

23. An apparatus as defined in claim 1, wherein said mounting means includes a pivot situated in the region of the center of gravity of said conveyor.

* * * * *